March 3, 1964 E. J. RUHNKE 3,122,987
MODULAR CONSTRUCTION OF BREWING APPARATUS AND HEATING STANDS
Filed April 5, 1961
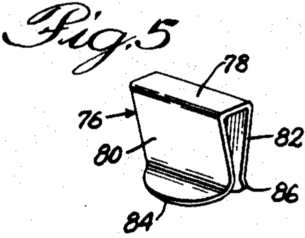
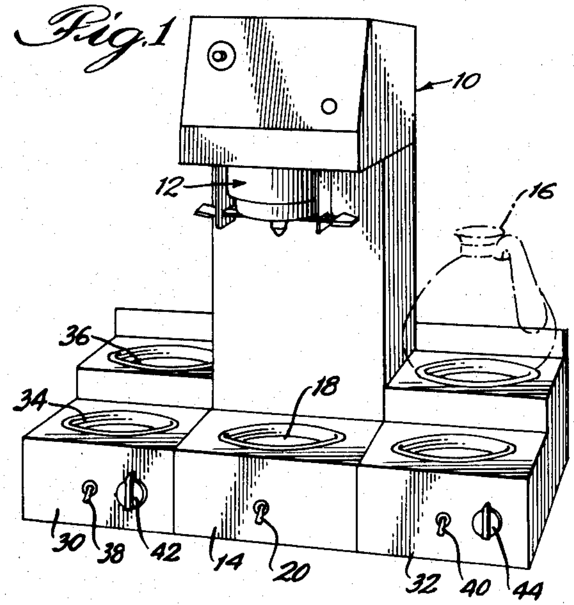
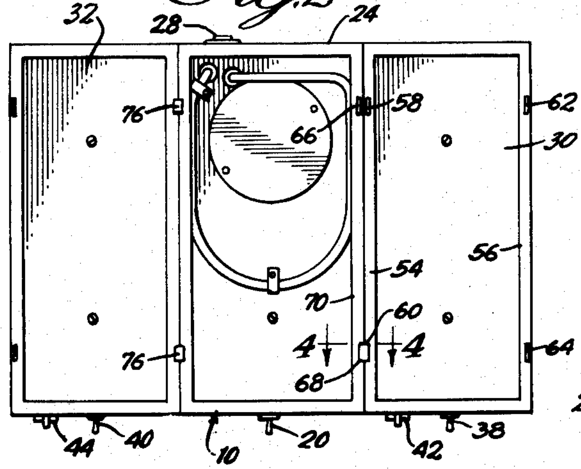
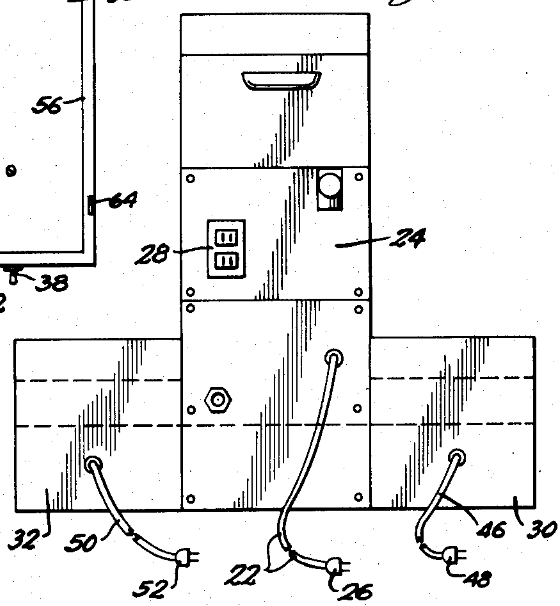
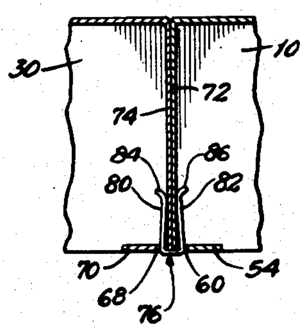
INVENTOR:
*Edward J. Ruhnke*,
BY
*Bair, Freeman & Molinare*
ATTORNEYS.

United States Patent Office 3,122,987

Patented Mar. 3, 1964

3,122,987

MODULAR CONSTRUCTION OF BREWING APPARATUS AND HEATING STANDS

Edward J. Ruhnke, Chicago, Ill., assignor to Hill-Shaw Co., Chicago, Ill., a corporation of Illinois Filed Apr. 5, 1961, Ser. No. 100,968
3 Claims. (Cl. 99—290)

This invention relates to a versatile and adjustable modular construction of brewing apparatus and heating stands, which is particularly suited for restaurant and other relatively large volume operations.

In the commercial use of brewing apparatus for brewing coffee or other beverages, heating stands are used therewith for interchangeable use in keeping the brewed beverage hot, heating water, and making other beverages. One or more hot plates may be mounted on the brewing apparatus, or separate heating stands may be provided. Very frequently, a large bulky unit is required or various expedients are adopted which may not be convenient, consume too much valuable space, are unattractive, or require excessive wiring for electrical outlets.

An important object of the present invention is to provide brewing apparatus and heating stands which overcome the prior disadvantages, in a very efficient, attractive, and economical manner.

Another important object is to provide brewing apparatus and heating stands which function as a single unit, yet which are adjustable and adaptable to fit the requirements of various situations.

A particular object is to provide such a combination which requires only a single standard electrical wall outlet for using the complete assembly.

Another particular object is to provide such a combination which may be used in whole or in part, and also which may function as individual units at separate locations, as desired.

An additional object is to provide a brewing apparatus and heating stands which are readily connected together in any order, as one unit, and which are easily disassembled and rearranged.

These and other objects, advantages and functions of the invention will be apparent on reference to the specification and to the attached drawings illustrating a preferred embodiment of the invention, in which like parts are identified by like reference symbols in each of the views, and in which:

FIGURE 1 is a front perspective view of the new modular construction of brewing apparatus and heating stands;

FIGURE 2 is a bottom plan view thereof, illustrating clip means at several locations securing the components together;

FIGURE 3 is a back elevational view thereof;

FIGURE 4 is an enlarged vertical cross sectional view taken on line 4—4 of FIGURE 2; and FIGURE 5 is a perspective view of a spring clip employed in the preferred embodiment.

In the new modular construction, a brewing unit is combined with one or more heating stands. An electrical conductor is provided on the brewing unit for connection to a power source. An electrical outlet receptacle is also provided on the brewing unit. An electrical conductor is provided on each heating stand which is connectable to the receptacle on the brewing unit. Means are provided for connecting the brewing unit and the heating stands together, as a single unit.

The drawings illustrate a portable automatic brewing unit or coffee maker indicated by the number 10, which includes brewing and dispensing apparatus 12 and a heating stand 14 therebelow and integral with the base of the unit. A decanter, such as illustrated in phantom lines at 16, may be seated on a hot plate 18 mounted on top of the heating stand, for receiving the coffee or other brewed beverage dispensed from the brewing apparatus 12. The coffee is kept hot in the decanter by operating a switch 20 on the front of the heating stand, to cause electrical current to flow through the heating element of the hot plate 18. An electrical conductor 22 extends from the back 24 of the brewing unit, and it is connected to a standard male electrical plug 26 for insertion in a standard wall electrical outlet connected to a source of electrical power. The conductor supplies the current for operating the brewing unit and the hot plate 18. The conductor also supplies electrical current to a 2-plug outlet receptacle 28 mounted on the back of the brewing unit.

The brewing unit 10 may be operated alone, but it is frequently necessary or desirable that additional heating stands be provided. In the invention, two individual heating stands 30 and 32, which may or may not be identical, are provided for use in combination with the brewing unit. Each of the stands contains two hot plates mounted at different elevations, as indicated by the numbers 34 and 36 for one stand 30. The heating stands are mountable in side-by-side relation to the brewing unit, with the front and back surfaces of the several structures aligned in the same planes, and with the upper or heating surfaces likewise aligned in the same planes. In this manner, the combination functions as and presents the appearance of a single unit. The heating stands 30 and 32 are also provided with respective individual switches 38 and 40 for operating the front hot plates corresponding to the number 34, and individual dial switches 42 and 44 for operating the rear variable resistance hot plates corresponding to the number 36. The brewing unit 10 and the heating stands 30 and 32 are thus adapted to be operated individually.

An electrical conduit 46 and male plug 48 extend from the back of the heating stand 30, and likewise, a conductor 50 and male plug 52 extend from the back of the second heating stand 32. These conductors and the conductor 22 on the brewing unit 10 may be connected individually and at separate locations to suitable electric outlets, for independent operation. It is an important feature of the invention that either or both of the plugs 48 and 52 may be plugged into the receptacle 28 on the back of the brewing unit, for operating the entire assembly by current supplied from the brewing unit conductor 22, connected to a single wall outlet. This is important and may be essential where few outlets are provided or considerable electrical apparatus is in operation. There is no necessity for special wiring, and the hazards of multiple cords extending around the establishment are avoided.

The brewing unit 10 and the heating stands 30 and 32 may be arranged abreast of each other in any order. They may be mounted as shown, one stand may be mounted at either side fo the brewing unit, or two stands may be mounted at either side with either stand adjacent to the brewing unit. In each case, the heat stand plugs 48 and 52 may be connected in the brewing unit outlet receptacle 28.

The brewing unit and the heating stands are connected together in the invention, to avoid the hazards attendant upon the use of loose individual units, provide a convenient and useful assembly, and present a neat, attractive appearance having the appearance of a single unit. In the preferred embodiment illustrated, the side walls of the brewing unit and heating stands are connected together, with any two walls adjacent to each other. They are connected together at their bases, for convenient access and also for obscuring the connections. As illustrated in FIGURES 2 and 4, horizontal base flanges are provided on each of the brewing unit and the heating stands, which are integral with the side walls thereof. Two slots are formed on each of two opposite flanges extending from the side walls of each of the housings. Referring to heating stand 30 as illustrative, flanges 54 and 56 on opposite sides of the stand are provided with respective pairs of slots 58 and 60, and 62 and 64. In any arrangement of the assembly in side-by-side relation, pairs of adjacent slots are formed in the adjoining flanges, as illustrated in FIGURE 2 by a pair of slots composed of the slot 58 on the heating stand 30 and the slot 66 on the brewing unit 10. A second pair of adjacent slots is illustrated in FIGURE 4, at 60 and 68. The slots are formed in the respective flanges 54 and 70 integral with vertical side walls 72 and 74 on the respective brewing unit 10 and heating stand 30.

The brewing unit and the heating stands are connected together by spring clips 76, illustrated in FIGURE 5. The clips are U-shaped, having a flat base 78, and integral sides 80 and 82 inclined towards each other and terminating in respective outwardly curved end flanges 84 and 86. The spring clips are inserted in pairs of adjacent slots as illustrated in FIGURES 2 and 4. In the latter illustration, one side 80 of the clip is inserted in slot 68 in the flange 70 of the heating stand 30, and the opposite side 82 of the clip is inserted in the slot 60 in the flange 54 of the brewing unit 10. The clip serves to hold the walls 72 and 74 together in abutting relation. The clips may be inserted and removed easily and rapidly, at convenient locations which are obscured from view. As is evident from inspection of FIGURE 2, the brewing unit and the heating stands may be rearranged in any order, and the clips 76 may be inserted in appropriate pairs of slots on adjoining flanges.

The invention thus provides a very useful modular construction of brewing apparatus and heating stands which eliminates the disadvantages previously encountered. A safe, compact, and attractive combination is furnished, which may be mounted in any appropriate location and which may be assembled and disassembled as required.

It will be apparent that various changes and modifications may be made in the construction and arrangement of the apparatus, within the spirit and scope of the invention. It is intended that such changes and modifications be included within the scope of the appended claims.

What I claim as new and desired to secure by Letters Patent of the United States is:

1. A modular construction of brewing apparatus and a heating stand which comprises a portable brewing and dispensing unit, an electrical conductor thereon for connection to a power source, an electrical outlet receptacle on said unit, a portable heating stand disposed in side-by-side abutting relation to said unit, an electrical conductor on said stand detachably connected to said receptacle, base flanges on said unit and said stand disposed in side-by-side relation to each other, means forming adjacent slots in said flanges on the respective unit and stand, and a spring clip means inserted into said adjacent slots connecting said unit and said stand together in side-by-side abutting relation.

2. A modular construction of brewing apparatus and heating stands which comprises a portable brewing and dispensing unit having upright sides, an electrical conductor thereon for connection to a power source, an electrical outlet receptacle for a plurality of plugs on said unit, a plurality of portable heating stands having upright sides mountable in side-by-side abutting relation to said unit in any order, an electrical conductor on each said stand detachably connected to said receptacle, base flanges on opposite sides of said units and said stands mountable in side-by-side relation to each other, means forming slots in said flanges adapted for mounting adjacent to slots in adjoining flanges, and U-shaped spring clips extending into said adjacent slots for connecting said unit and said stands together in any selected order in side-by-side abutting relation.

3. A modular construction of brewing apparatus and heating stands which comprises a portable brewing unit having upright side walls, an electrical conductor thereon for connection to a power source, extending from the back of said unit, an electrical outlet receptacle on the back of said unit, a portable heating stand having upright side walls and being disposed in aligned side-by-side abutting relation to said unit, an electrical conductor on the back of said stand detachably connected to said receptacle for supplying power to said stand, and spring-type U-clips engaging adjacent side walls of said unit and said stand adjacent their bases, and thereby connecting adjacent side walls of said unit and said stand together in abutting relation.

References Cited in the file of this patent

UNITED STATES PATENTS

| | | |
|---|---|---|
| 1,584,281 | Dumas | May 11, 1926 |
| 2,203,716 | Bergman | June 11, 1940 |
| 2,530,643 | Berg | Nov. 21, 1950 |
| 2,551,219 | Peters | May 1, 1951 |
| 2,576,409 | Michaelis | Nov. 27, 1951 |
| 2,785,940 | Felton | Mar. 19, 1957 |